(12) United States Patent
Brix

(10) Patent No.: US 7,071,425 B2
(45) Date of Patent: Jul. 4, 2006

(54) WEIGHING MACHINE HAVING A CENTRAL DISTRIBUTOR TO SCALES

(75) Inventor: Flemming Brix, Ry (DK)

(73) Assignee: Bilwinco A/S, Skanderborg (DK)

( * ) Notice: Subject to any disclaimer, the term of this patent is extended or adjusted under 35 U.S.C. 154(b) by 0 days.

(21) Appl. No.: 10/509,815

(22) PCT Filed: Apr. 7, 2003

(86) PCT No.: PCT/DK03/00224

§ 371 (c)(1),
(2), (4) Date: Apr. 13, 2005

(87) PCT Pub. No.: WO03/087736

PCT Pub. Date: Oct. 23, 2003

(65) Prior Publication Data

US 2005/0205308 A1    Sep. 22, 2005

(30) Foreign Application Priority Data

Apr. 7, 2002   (DK) ............................... 2002 00505

(51) Int. Cl.
  *G01G 19/387*   (2006.01)
  *B65G 27/24*    (2006.01)
  *B65G 27/28*    (2006.01)
  *B65G 27/26*    (2006.01)

(52) U.S. Cl. ........................... 177/25.18; 177/DIG. 11; 198/533; 198/760

(58) Field of Classification Search ............. 177/25.18, 177/DIG. 11; 198/533, 760
See application file for complete search history.

(56) References Cited

U.S. PATENT DOCUMENTS

| 2,610,726 A * | 9/1952 | Howard ..................... 198/535 |
| 2,797,796 A * | 7/1957 | Carrier, Jr. et al. ......... 198/760 |
| 4,398,612 A | 8/1983 | Mikami et al. ........... 177/25.18 |
| 4,600,096 A | 7/1986 | Yamano et al. ............. 198/533 |
| 4,615,403 A | 10/1986 | Nakamura ............... 177/25.18 |
| 4,683,966 A | 8/1987 | Nakagawa et al. ....... 177/25.18 |
| 4,821,782 A * | 4/1989 | Hyer ........................... 141/83 |
| 6,271,484 B1 * | 8/2001 | Tokutsu .................... 177/25.13 |
| 6,291,781 B1 * | 9/2001 | Ohtani et al. ............ 177/25.18 |
| 6,376,784 B1 * | 4/2002 | Morinaka ................... 177/121 |

FOREIGN PATENT DOCUMENTS

EP   0 075 488   3/1983
EP   0 781 718   7/1997

* cited by examiner

Primary Examiner—Randy W. Gibson
(74) Attorney, Agent, or Firm—Ladas & Parry

(57) ABSTRACT

The invention relates to a weighing machine for weighing portions of material, which weighing machine comprises a frame structure on which a central distributor, a plurality of linear conveyors and a plurality of scales are mounted, and wherein the linear conveyors are arranged around the central distributor and each is configured as a conveyor duct suspended in relation to a counterweight by means of spring elements extending between the conveyor duct and the counterweight in such a manner that the transport duct is, by means of a vibrator intended therefore, caused to vibrate in a vibration pattern causing it to transport, during the vibration, maerial from the centra distributor and radially outwards to the scales. The invention is characterised in that the counterweight for each of the transport ducts in the linear conveyors are constituted of the frame structure of the machine, the spring elements for each transport duct being mounted directly on the frame structure.

11 Claims, 1 Drawing Sheet

WEIGHING MACHINE HAVING A CENTRAL DISTRIBUTOR TO SCALES

Figure 1:
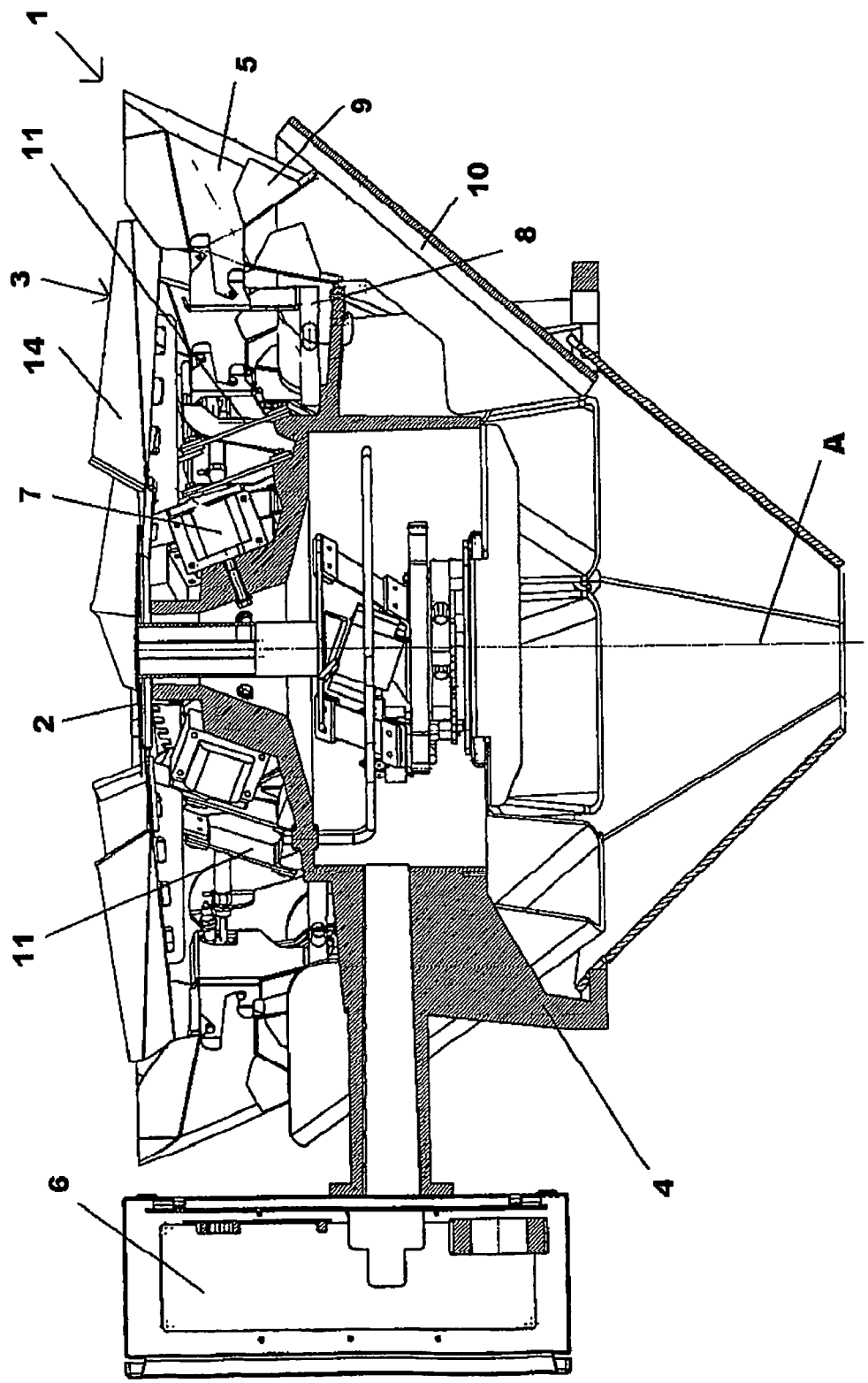

The present invention relates to a weighing machine for weighing portions of material, said weighing machine comprising a frame structure on which a central distributor is provided, a plurality of linear conveyors and a plurality of scales, and wherein the linear conveyors are arranged around the central distributor and each is configured as a conveyor duct suspended relative to a counterweight by means of spring elements extending between the conveyor duct and the counterweight in such a manner that the conveyor duct may be caused to vibrate by means of a vibrator intended therefore in a vibration pattern causing it to transport, during vibration, material from the central distributor and radially outwards to the scales.

Such weighing machines are used today primarily for generating portions of bulk material of a weight that is very close to a desired reference weight, thereby allowing the portions to be transferred to eg a packaging apparatus that packs the individual portions.

These weighing machines that are often designated combination weighing machines serve by each of the scales being, by means of the conveyors, charged with a constituent portion of the bulk material which was initially supplied to the central distributor and then, via the central distributor, it is transferred to the individual linear conveyors. Then the individual constituent portion of the bulk material is weighed in the individual scales, and by means of a calculator or a computer the scales are found that combine to contain bulk material of a weight close to the desired reference weight. Finally, the calculator is configured for activating the thus found scales to be emptied for forming the combined portion of the bulk material, and since combinations of scales that combine to contain the desired weight are continuously made and found, these machines enable very high production rates while forming many material portions that exhibit very small weight variations.

It is a problem of the prior art machines for this purpose, however, that it is necessary to configure both the central distributor and the individual conveyors such that a certain clearance is provided between them, and since there is often a considerable amount of the bulk material on them, practice has shown that it is difficult to avoid that material, be it loose objects or liquid, pass through the clearances provided between the central distributor and the conveyors and between the conveyors as such.

In case of the prior art machines, it is thus often necessary to perform regular cleaning of the machine. Such material parts often deposit on the frame parts of the machine and they may wedge firmly between various constituents, thereby rendering cleaning difficult with ensuing problems eg with regard to hygiene.

In the light of this it is the object of the present invention to provide a weighing machine of the kind described above, whereby these hygiene problems have been completely or partially remedied.

This is accomplished in accordance with the invention as featured in claim 1 in that the counterweight for each of the transport ducts in the linear conveyors is constituted by the frame structure of the machine, the spring elements configured for each conveyor duct being mounted directly on the frame structure.

Thereby, a considerable amount of the components are removed that are, in conventional combination weights, used for providing counterweight for the vibrating linear conveyors, and the conventionally employed dampers in the form of rubber suspensions, etc, that have so far been provided between the counterweight in the linear conveyors and the frame structure of the machine. The number of faces and hiding places underneath the linear weights where material fragments may deposit or wedge firmly is thus considerably reduced thereby considerably facilitating cleaning of the combination weight.

According to the invention it is possible to employ various means for driving the vibration of the linear conveyors, but according to the preferred embodiment this is established by the vibration of each conveyor duct comprising an current-carrying magnetizing element that will, by application of a current, emit a varying magnetic field, and wherein the current-carrying magnetizing element is mounted directly on the frame structure of the machine in such a way, that the magnetic field produced by the magnetizing element influences a conveyor duct configured opposite the magnetizing element to vibrate in relation to the frame structure of the machine. As it is, this will involve complete or partial compensation of the vibrations transferred to the machine's frame structure via the spring elements.

In this context it is also an option that each of the scales is, via an electrical weighing cell, mounted directly on the frame structure of the machine, which weighing cell is configured for emitting an electrical signal in response to the force by which the scale influences the weighing cell, and wherein weighing operations can be performed of constituent portions while simultaneously the linear conveyors are caused to vibrate, in that the machine comprises control means configured for individually and as needed activating and stopping the vibrations in each of the conveyor ducts, and wherein a calculator unit is also provided for carrying out a calculation of the weight of material in each of the scales, while simultaneously vibrations are activated in one or more of the conveyor ducts.

Since, by the construction according to the present invention, the surprising effect is accomplished that the vibrations transferred to the frame structure of the machine are comparatively small it is an option that, in the weighing cell for each of the scales, means are advantageously provided for filtering off the electrical signals emitted by the weighing cell due to vibrations transmitted from the linear conveyors through the frame structure of the machine and to the weighing cell, which is a very simple way to remove noise, if any, from the weighing signal from each weighing cell, provided the noise was initiated by the vibrations in the linear conveyors.

According to a particularly inexpensive and hence advantageous embodiment the means for filtering-off are in the form of an electronic filter.

In order to further obviate that the vibrations from the vibrating, linear conveyors are to result in noise in the weighing signal from the individual scales, the frame structure of the machine is, according to an advantageous embodiment of the invention, manufactured in a moulding process by use of a metallic casting material, such as aluminium or some other metal alloy that is suitable for moulding. Hereby it is enabled that it is possible in an easy manner to make such reinforcements and material thicknesses on the frame structure of the machine that, to the widest extent possible, reduce or remove vibrations that can be transmitted from the vibrating, linear conveyors and to the weighing cells.

According to a preferred embodiment this is accomplished in particular by the frame structure having an overall weight that is at least ten times and preferably more than forty times the weight of each of the conveyor ducts.

According to a further preferred embodiment of the invention it is possible to accomplish a further hygienic effect by configuring the frame structure such that it comprises one or more essentially uninterrupted shieldings in the form of shield faces that extend from a point below the central distributor or underneath the linear conveyors and outwards and downwards underneath at least that end of the conveyors that, in the working position of the machine, faces away from the central distributor. Thereby the frame structure as such may in itself cause any bulk material that drops there onto to slide off the frame structure or at least be easily removable there from.

The invention will now be described in further detail with reference to the drawing, wherein:

FIG. 1 is a sketch showing in a planar sectional view through the central axis of the machine a weighing machine according to the invention, seen from the side;

Thus, FIG. 1 illustrates a weighing machine 1, which weighing machine 1 comprises, like commonly known weighing machines for combined weighing of material, a central distributor 2, a number of conveyors 3 provided with ducts 14 and a number of scales 5. As is commonly known in case of combination weighing machines of this type, a fully mounted weighing machine comprises a plurality of such linear conveyors 3 and scales 5 arranged peripherally in a circle around the central distributor. The machine 1 is constructed essentially symmetrically about its centre axis A and it comprises, as shown, a frame structure 4, which is highlighted herein by hatching, on which conveyors 3 and scales 5 are mounted; in addition to this, the machine is provided with a guide housing 6 directly on the frame structure 4 of the machine, thereby considerably increasing the overall weight of the frame structure 4.

The functioning of the weighing machine 1 is such that, on the central distributor 2, an amount of bulk material desired to be portion is deposited. It may be eg objects of use, such as nails, screws, nuts, etc, or it may be food products, such as pieces of candy, winegum, fish or cheese.

By means of the central distributor 2, the bulk material is distributed on the individual conveyors 3. This may be accomplished in that the bulk material slides on the central distributor, but often particular means are used to ensure such distribution, such as a vibrator as shown in the drawing and configured for imparting to the central distributor a spiralling movement about the central axis A of the weighing machine.

When the bulk material from the central distributor 2 reaches each of the conveyors, they will use eg a linear vibration motor 7, here in the form of an electrical coil being, according to a preferred embodiment, mounted directly on the frame structure 4 of the machine and induced with an alternating current that thus generates a varying magnetic field in front of the coil 7 and causes the linear conveyor 3 to vibrate in a vibration pattern that ensures that the bulk material is moved outwards towards the peripherally arranged scales 5 that are thus filled at least partially with a portion of the bulk material. The scales 5 being thus each provided with a weighing cell 8 for weighing off the transferred portion, the individual portions can hereby be weighed, and the bottom of the scale 5 being configured with an activatable flap 9, the weighed portion can be discharged in the collecting funnel 10 of the machine.

Several such linear conveyors 3 and scales 5 being provided, it is obvious that the above-mentioned functioning with a convenient control, such as a computer control, configured in the shown guide housing 6, is able to perform repeated weighing operations and discharge operations of individual portions of the bulk material, and by combining two or more of the portions it is possible to form portions with very small variations compared to a desired weight.

According to a preferred embodiment of the invention, the linear conveyors 3 are suspended directly on the frame structure 4 of the machine by means of leaf springs 11, whose one end is secured to the frame structure 4 of the machine, and whose other end is secured to the duct 14. In a commonly known manner these leaf springs 11 are located in an inclined angle relative to vertical in such a manner that the ducts are able to vibrate along a path that extends upwards and outwards, respectively, in relation to the central axis of symmetry A of the machine and back. This causes, in a known manner, material that is located on the vibrating duct 14 to be transported outwards towards the periphery of the machine 1 as mentioned above.

The frame structure 4 according to the invention is, as indicated in the drawing, configured as a moulded piece, eg in aluminium, which brings about a high degree of freedom from a design point of view with regard to reducing the natural oscillations, if any, that may be generated in the frame structure 4 from the vibrating linear conveyors 3. This can be accomplished eg by designing the frame structure 4 such that its inherent frequency is suitably far from the frequency for the alternating voltage applied to the electrical coils 7. For instance, it can also be accomplished by designing the frame structure 4 to have a weight that considerably exceeds the weight of the individual ducts 14. This increase in the weight of the frame structure 4 of the machine can also be enhanced by integrating as many constituent elements of the machine construction as possible in the frame structure of the machine, or by mounting them securely thereto. Thus, in the shown construction not only the counterweights of the linear conveyors 3 are integrated in the frame structure, in accordance with the invention; but the shown control housing 6 contributes further to the overall weight.

The invention claimed is:

1. In a weighing machine for weighing portions of material, which weighing machine comprises a frame structure on which a central distributor, a plurality of linear conveyors and a plurality of scales are mounted, and wherein the linear conveyors are arranged around the central distributor and each is configured as a conveyor or transport duct suspended in relation to a counterweight by means of spring elements extending between the conveyor or transport duct and the counterweight in such a manner that the conveyor or transport duct is, by means of a vibrator therefor, caused to vibrate in a vibration pattern causing it to transport, during the vibration, material from the central distributor and radially outwards to the scales, the improvements characterised in that the counterweight for each conveyor or transport duct is the frame structure, the spring elements for each conveyor or transport duct being mounted directly on the frame structure.

2. A weighing machine according to claim 1, characterised in that the vibrator configured for each transport duct comprises a current-carrying magnetizing element that will, by application of a current, emit a varying magnetic field, and wherein the current-carrying magnetizing element is mounted directly on the frame structure of the machine in such a manner that the magnetic filed emitted from the magnetizing element influences a transport duct arranged opposite the magnetizing element to vibrate in relation to the frame structure of the machine.

3. A weighing machine according to claim 1, characterised in that each of the scales is, via an electrical weighing cell, mounted directly on the frame structure of the machine, said weighing cell being configured for emitting an electrical signal in response to the force by which the scale influences the weighing cell.

4. A weighing machine according to claim 3, characterised in that the machine comprises control means that are configured for individually and as required activating and discontinuing the vibrations in each of the conveyor ducts, and wherein there is further provided a calculator unit for performing a calculation of the weight of material in each of the scales, while simultaneously vibrations are activated in one or more of the conveyor ducts.

5. A weighing machine according to claim 4, characterised in that, in the calculator unit or the weighing cell for each of the scales, means are provided for filtering off the electrical signals emitted by the weighing cell due to vibrations transmitted from the linear conveyors through the frame structure of the machine and to the weighing cell.

6. A weighing machine according to claim 5, characterised in that the means for filtering off are in the form of an electronic filter.

7. A weighing machine according to claim 6, charactensed in that the frame structure of the machine is manufactured in a moulding process by use of a metallic moulding material.

8. A weighing machine according to claim 7, characterised in that the frame structure has an overall weight that is at least ten times the weight of each of the conveyor ducts.

9. A weighing machine according to claim 8, characterised in that the frame structure of the machine comprises one or more essentially uninterrupted shielding in the form of shield faces that extend outwards and downwards in relation to the centre axis A of the machine underneath the central distributor 2 and/or the linear conveyors 3.

10. A weighing machine according to claim 7, wherein the metallic moulding material is aluminium or other metal alloy.

11. A weighing machine according to claim 8, wherein the overall weight is more than 40 times the weight of each of the conveyor ducts.

* * * * *